United States Patent [19]

Wagster et al.

[11] 4,248,411
[45] Feb. 3, 1981

[54] APPARATUS FOR SUPPORTING A WORK PIECE

[75] Inventors: Robert P. Wagster, Greensboro, Md.; Carl H. Onken, Jr., Middletown, Ohio

[73] Assignee: Black and Decker, Inc., Towson, Md.

[21] Appl. No.: 39,243

[22] Filed: May 15, 1979

[51] Int. Cl.³ .............................................. B23Q 1/04
[52] U.S. Cl. ....................................... 269/67; 269/97; 269/139; 269/208; 269/244; 269/283
[58] Field of Search .............................. 269/95, 97–98, 269/67, 63, 208, 219–220, 240, 244, 283, 139; 144/286 R, 286 A, 287, 288 R, 288 C; 108/9–10

[56] References Cited

U.S. PATENT DOCUMENTS

| | | | |
|---|---|---|---|
| 1,932,543 | 10/1933 | Dow | 108/9 |
| 2,645,067 | 7/1953 | Hinderer | 33/174 S |
| 2,889,757 | 6/1979 | Cole | 33/174 S |
| 4,061,323 | 12/1977 | Beekenkamp | 269/139 |
| 4,126,304 | 11/1978 | Barck | 269/97 |
| 4,154,435 | 5/1979 | Alessio | 269/139 |

Primary Examiner—Robert C. Watson
Attorney, Agent, or Firm—Frank J. Thompson; Edward D. Murphy; Leonard Bloom

[57] ABSTRACT

A worktable adapted to be mounted to the surface of an auxiliary support structure is disclosed having means for selectably orientating a worktable surface to enable a gripped work piece to be positioned at different attitudes.

20 Claims, 8 Drawing Figures

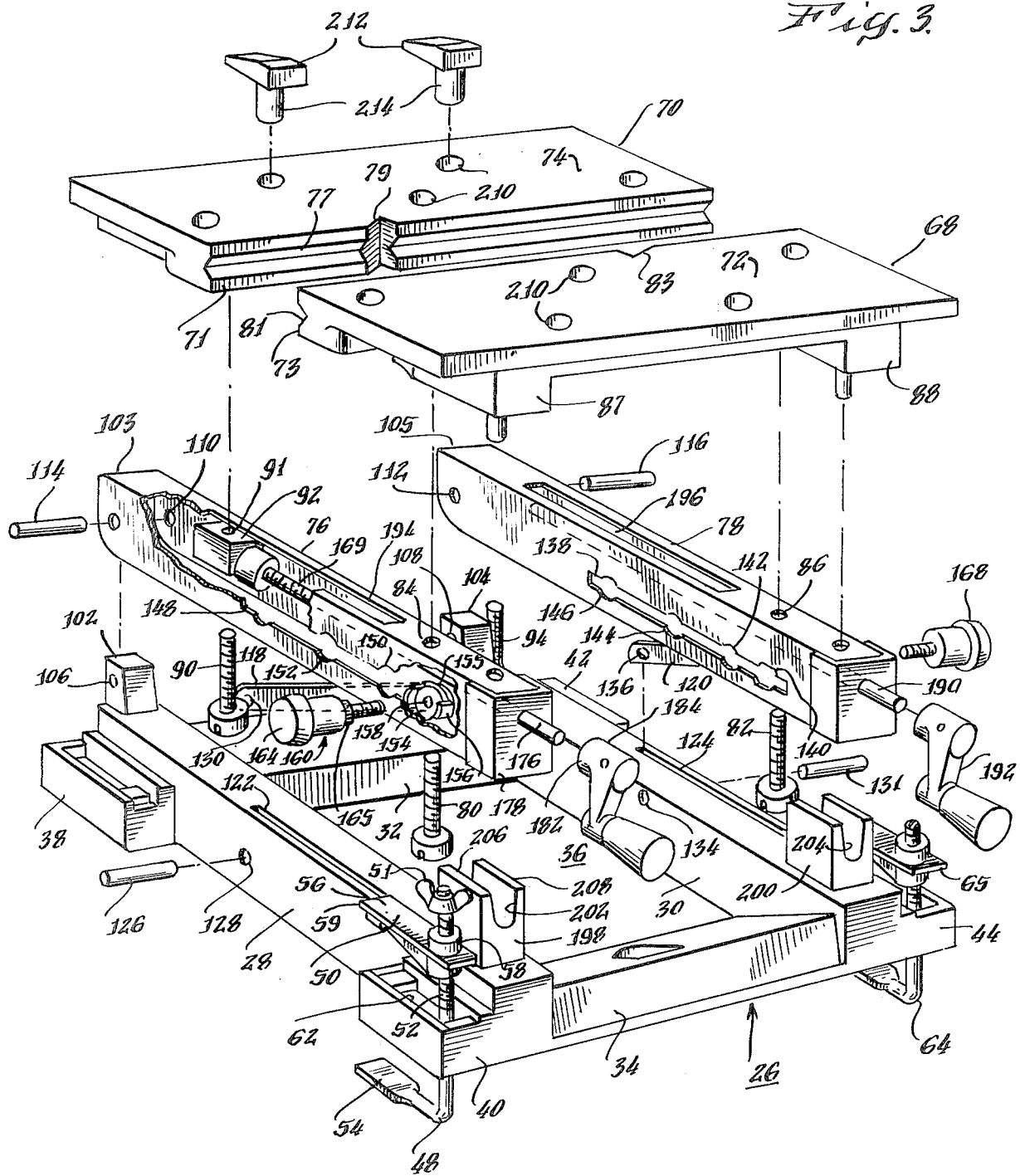

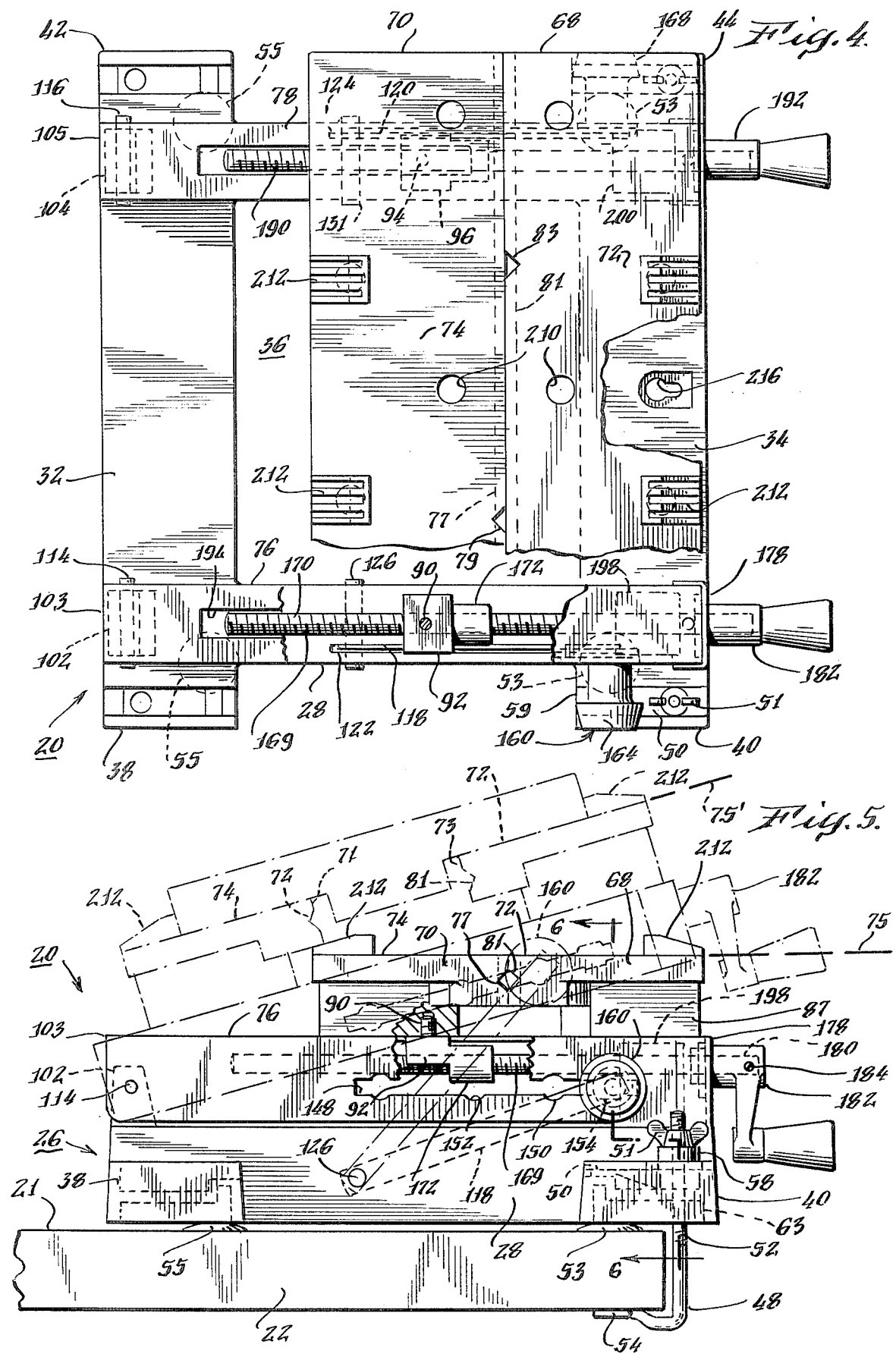

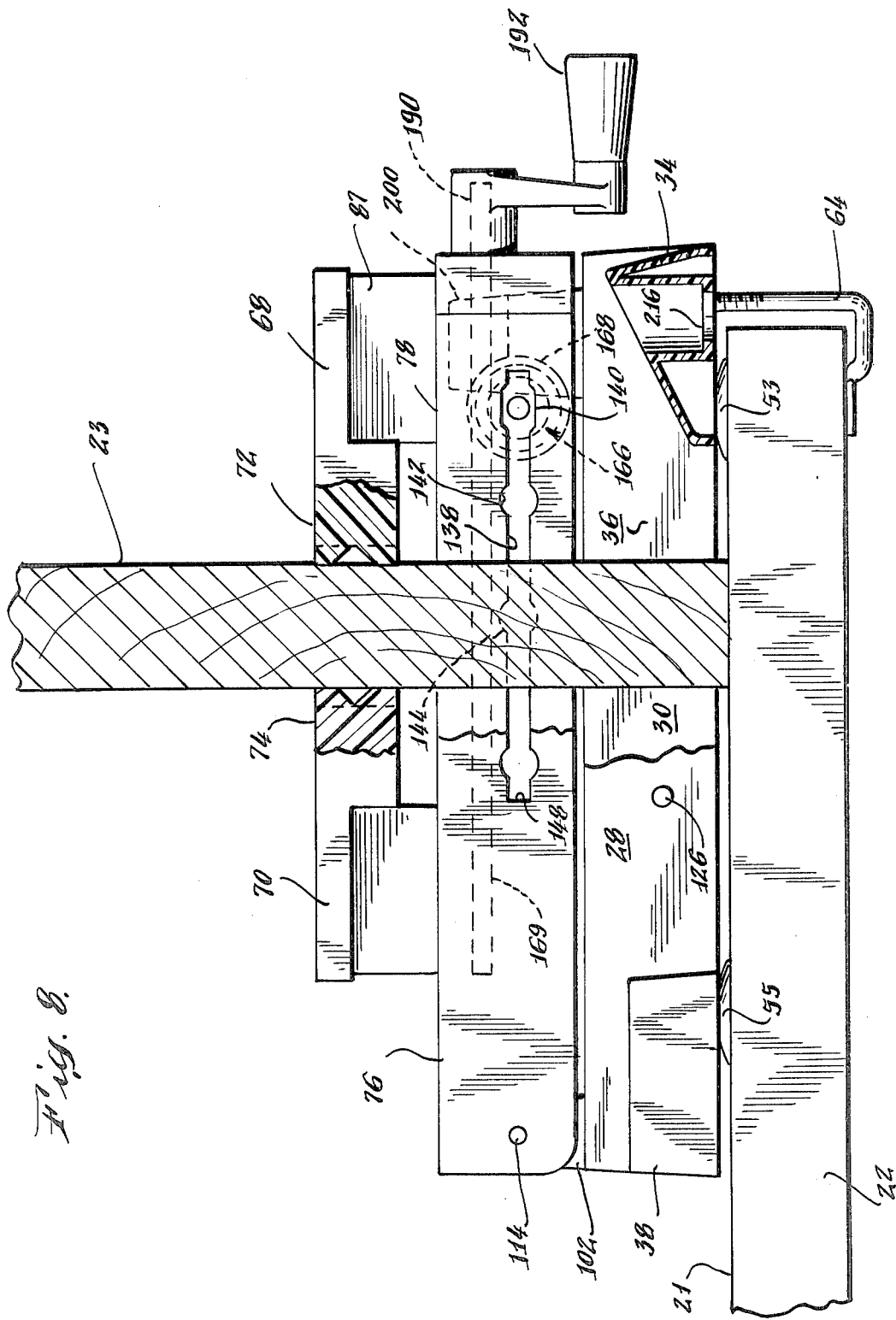

APPARATUS FOR SUPPORTING A WORK PIECE

BACKGROUND OF THE INVENTION

1. Field of the Invention

This invention relates to apparatus for supporing work pieces. The invention relates more particularly to an improved portable worktable for use with an auxiliary support structure.

2. Description of the Prior Art

Workbenches usually are large, heavy duty tables configured to support a work piece at about waist high level. The work piece may be supported on a flat surface and maintained in position by hand or by auxiliary hold downs. Alternatively, it is common practice to provide a vise gripping means which is mounted to the workbench. The vise gripping means generally comprises a pair of jaws, one of which is stationary and the other of which is actuated relative to the stationary jaw by a screw. The vise is permanently mounted to the workbench near an edge thereof or, alternatively, the vise is readily demountable by means such as a suction surface, clamp, etc. While the permanently mounted vise may include an anvil segment and a relatively small working surface, such surfaces are considered impractical as a general working surface and are utilized generally only for specialized, heavy duty forming operations such as setting rivets, hammering shapes, etc.

There are a number of occasions when it is desirable to provide a means for gripping a work piece at a particular site yet it is impractical to provide a workbench at the location because of such factors as the setup cost involved, the unavailability of space, etc. In satisfying this need, a portable workbench which is collapsible for transport and storage has been provided. The collapsible feature of the workbench enables it to be compacted and stored in those cases wherein insufficient space is available for permanent installation of a workbench yet it is readily set up as the need arises. Portability is advantageous since the workbench may be transported from work site to work site where it would be impractical to provide a permanently installed workbench at each work site. A workbench which exhibits these features and which advantageously incorporates a vise grip having vise jaw angularity control is disclosed in U.S. Pat. Nos. 3,615,087, 3,841,619, and 4,076,229 to Arnold Hickman which are assigned to the assignee of this invention.

In prior workbench configurations whether permanently installed workbenches or portable collapsible workbenches, the workbench structure includes means for positioning a work piece at a convenient working level such as waist high level. The workbench therefore utilizes structural means such as leg members for supporting the work piece at an elevated position. Workbench materials which accomplish this positioning contribute to an increase in the size, relative complexity and cost of the workbench. Even a portable collapsible workbench of this type occupies a substantial amount of space and can be relatively heavy and costly.

While there have been developed waist high portable workbenches, there exists a need for a portable, light weight worktable with work piece gripping means, which provides a substantial work surface, which is relatively light and compact, which can be used at a convenient height such as waist height but which does not require supporting substructure thereby facilitating its portability and storage, and which can be fabricated at a relatively low cost. A worktable providing these features is disclosed in a co-pending U.S. patent application Ser. No. 039,244 which is filed concurrently herewith and which is assigned to the assignee of this invention. The portable worktable described in the copending application is adapted to be mounted to any conveniently available auxiliary support structure which is selected by a user for positioning a work piece at a desired level.

The worktable of the aforementioned co-pending patent application provides a relatively large working surface yet a substantially low profile to advantageously reduce the overall space occupied by it and facilitate its storage. At times, a conveniently available auxiliary support surface is not adapted to mount the worktable so as to support a work piece at a desired attitude. Even in the case of the usually available horizontal work surface, it may be desirable to orientate a work piece at an angular elevation with respect to the horizontal. This is particularly true, for example, when the worktable is used to support work pieces in the arts and crafts. It is desirable to provide a portable worktable of the type described which, after mounting to a support structure, is adapted to alter the position of a work plane of the worktable yet which maintains its relatively low profile.

SUMMARY OF THE INVENTION

Accordingly, it is an object of the invention to provide an improved portable worktable which is adapted for mounting to an auxiliary support surface.

Another object of the invention is to provide a portable worktable adapted to be mounted to an auxiliary support structure and having the means for varying the orientation of a work plane of the worktable.

Another object of the invention is to provide a portable worktable for mounting to a surface of an auxiliary support structure having means for tilting a work plane of the worktable to a plurality of convenient angular elevations with respect to the support surface.

Another object of the invention is to provide a portable worktable having means for selectably adjusting the elevation of a work plane of the worktable and for locking the worktable at a selected elevation. A further object of the invention is to provide a means for indexing the work plane of the worktable at a predetermined angular elevation and for locking the work plane at the predetermined elevation.

Another object of the invention is to provide a tilt control for a portable table which is relatively non-complex and which can be fabricated at relatively low cost.

In accordance with a general aspect of the invention, a portable worktable adapted for mounting to a surface of an auxiliary support structure includes means for selectably varying an angular orientation of a work plane of the worktable with respect to the mounting surface and for maintaining the worktable at the selected orientation. In accordance with more particular features of the invention the worktable comprises first and second elongated table members each having a planar work piece support surface for supporting and gripping a work piece. The work members are mounted to a support base in a work plane having a first orientation which is substantially parallel to and juxtaposed with the base and which provide for selectably varying the orientation of the work plane from the first orientation to a plurality of different non-parallel orientations. A means is provided for maintaining the work surface at a selected work plane orientation. Adjustable means are provided for varying the relative position of the table members in the work plane to provide a spacing between the members for receiving and gripping work pieces of different sizes. A means is also provided for mounting the support base to the support surface of the auxiliary support structure.

BRIEF DESCRIPTION OF THE DRAWINGS

These and other objects and features of the invention will become apparent with reference to the following specifications and to the drawings wherein:

FIG. 3 is an exploded perspective view of the worktable of FIGS. 1 and 2;

FIG. 4 is a plan view, partly broken away and partly in section of the worktable of FIG. 1;

FIG. 5 is a side elevation view of the worktable of FIG. 4 illustrating the worktable at different orientations;

FIG. 8 is a fragmentary side elevation view, partly in section illustrating a work piece which is gripped by the worktable of the invention and which is supported by an auxiliary support structure.

DETAILED DESCRIPTION

Figure 1:
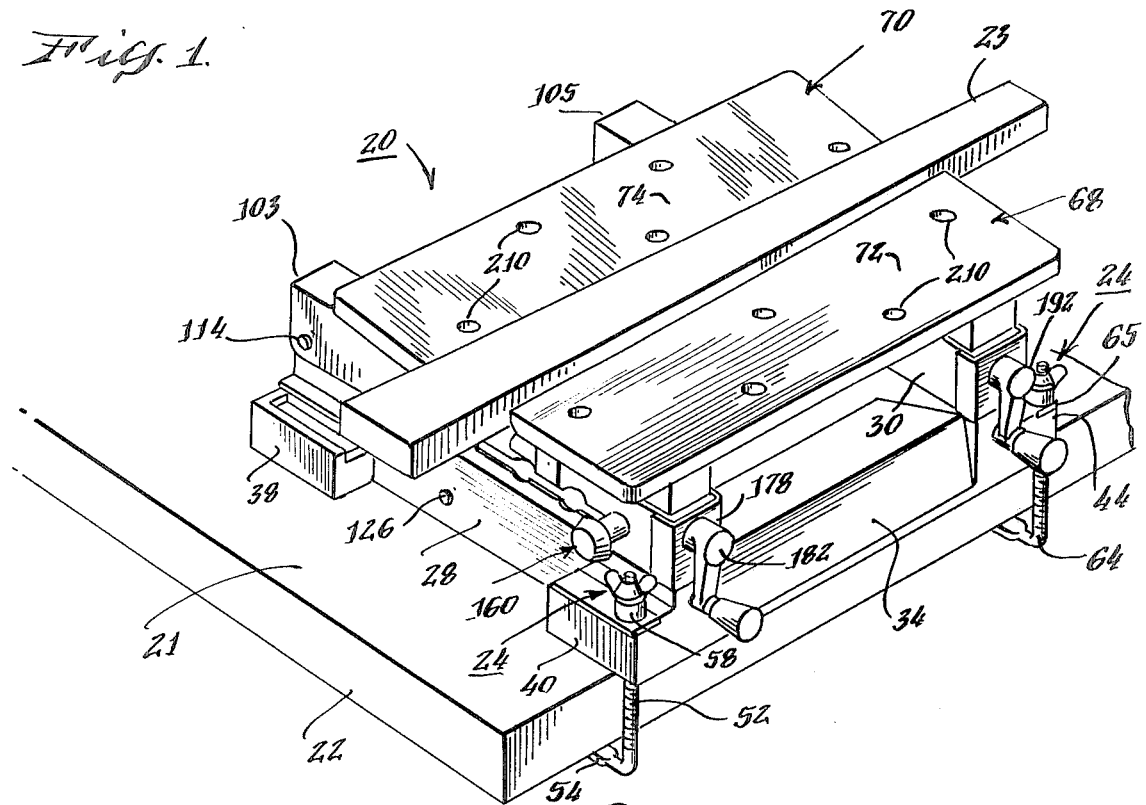
FIG. 1 is a perspective view illustrating the worktable of this invention.
Figure 2:
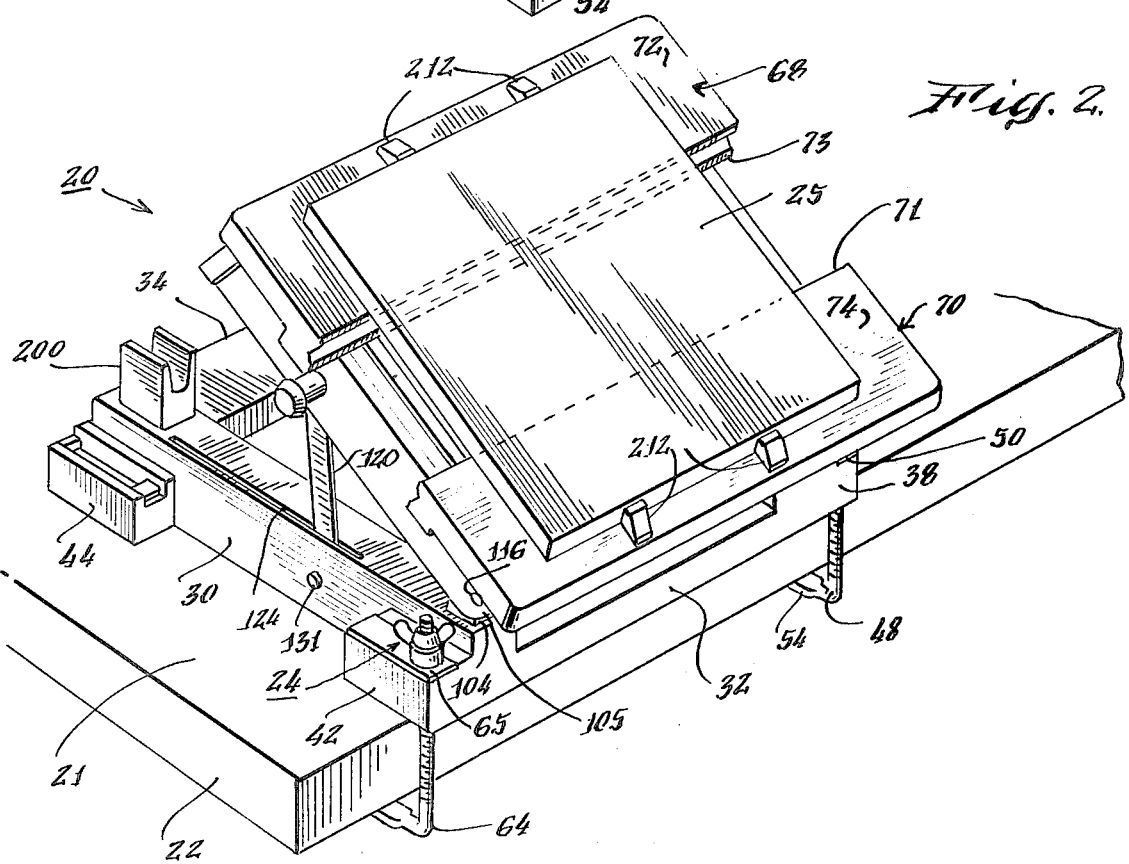
FIG. 2 is another perspective view of the worktable illustrating an alternative orientation of the worktable.

Referring now to the drawings and particularly to FIGS. 1 and 2, the worktable 20 of the invention is shown positioned on and mounted to a surface 21 of an auxiliary support structure 22. For purposes of this specification and the appended claims, the term worktable is understood to means an apparatus having a table surface but which lacks the supporting substructure including legs and the like for positioning the table surface on the floor or ground at a convenient working elevation above the floor or ground such as at waist height. The support structure 22 comprises, for example, a workbench, a table a desk or other body which provides a support surface of sufficient area to receive and position the worktable 20 and to enable manipulation of the workpiece 23 in FIG. 1 and the workpiece 25 of FIG. 2. Although the auxiliary structure 22 is shown to provide a horizontal mounting surface 21 extending in a first plane, the worktable 20 can also be mounted to surfaces oriented at other angles and attitudes in accordance with a user's particular needs and availability of structure 22. Thus, the structure 22 can also comprise structures such as a vertical wall or studs and the worktable 20 can be mounted at orientations other than horizontal and vertical. The worktable 20 is mounted to the work surface 21 by a base mounting means 24 which is described in greater detail hereinafter.

Referring now to FIG. 3, a worktable support base means referenced generally by numeral 26 is adapted to be supported on the auxiliary support surface 21 and orientated in a direction parallel to the plane of this surface. Base means 26 is shown to comprise a plurality of base members including a first, elongated base member 28, a second elongated base member 30 which is aligned parallel with member 28, a third elongated base member 32 extending transversely between the members 28 and 30 and a fourth elongated base member 34 which extends parallel to the member 32 and transversely to the members 28 and 30. The base members 28, 30, 32 and 34 are generally channel shaped and are integrally formed of a structural foam polymer plastic in an annular, frame shaped configuration which defines an enclosed aperture 36. The provision of an aperture 36, as indicated hereinafter with respect to FIG. 8, enables a work piece being gripped by the worktable of this invention to extend through the worktable and have its weight supported by the auxiliary surface 21 or enable the surface 21 to function as a steady rest for the work piece during a forming or other operation.

The base mounting means 24 for mounting the base support means 26 to the auxiliary support structure 22 includes a plurality of mounting bosses 38, 40, 42 and 44 which are integrally formed with the base support means 26. Bosses 38 and 40 are shaped generally as rectangular parallelopipeds and extend longitudinally and transversely from the member 28 at opposite ends of this member. Bosses 42 and 44 are similarly shaped and are formed with the base member 30. The base mounting means further includes a clamp means comprising a two piece clamp having screw and block members 48 and 50 respectively and a locking nut 51. The clamp means cooperates with the boss 40 for securing the base 26 at the location of the boss 40, to the auxiliary surface 21. As best seen in FIG. 3, the clamp screw member 48 includes an integrally formed rectilinear, externally threaded segment 52 and an integrally formed, flat segment 54 which extends normally to the segment 52. The clamp block 50 is a generally rectangular shaped body having an upper flat surface segment 56 and an integrally formed cylindrically shaped segment 58. The thickness of block 50 tapers from a relatively narrow end 59 to the cylindrical segment 58. The screw segment 52 extends through an aperture 60 (FIG. 6) in the boss and through a bore 61 in the cylindrical segment 58 to engage the wing nut 51. A cavity 62 in the boss 40 is configured to receive and to mate with a tapered surface of the clamp block 50. The boss 40 further includes a recess 63 (FIG. 5) for receiving the flat segment 54 of the L-shaped clamp screw 48 thereby enabling retraction of this screw segment and nesting in the recess 63 so that it is flush with a lower surface of the support base 26. In a stored condition, the block 50 is positioned in the cavity 62 and the flat segment 54 is withdrawn into the recess 63 of the boss 40. The block 50 and the flat segment 54 are maintained in this position by the wing nut 51 which is threaded onto the screw segment 52 snugly holding these members in position. When it is desired to clamp the base support means 26 to a support structure 22, the wing nut 51 is unthreaded up the segment 48 for a sufficient length to enable extension of the screw from the boss and extension of the flat segment 54 from its nested position. The screw 60 is unthreaded a sufficient length to enable the flat 54 to extend under the support structure 22. The nut 51 is then threaded to a snugged-up position against the raised cylindrical segment 58 (FIG. 4). In this clamped condition, the boss 40 is securely clamped to the structure 22. A plurality of such clamp means are provided as is exemplified by the L-shaped clamp screw 64 and a clamp block 65 utilized in cooperation with the boss 44.

A convenient and advantageous feature of the base mounting means 24 provides a plurality of bosses and associated clamping means which enables a user to position and mount the worktable on a support surface with increased facility since mounting is enhanced by the number and the locations of clamping means. In particular, the clamp means can be used with the bosses 38 and 42 in addition to, or alternative to, their uses with the bosses 40 and 44. When the base means 26 is positioned adjacent a corner of a support structure 22, three of the mounting means can be utilized for mounting the base means 26 to the support structure 22. Furthermore, while a feature of the invention is the relative portability of the worktable 20, it can be permanently mounted to the support structure 22 without structural modification to the worktable by forming bores in the support structure 22 in alignment with the apertures 60 in the base and by extending a clamp screw segment 52 or other permanent mounting means as, for example, a bolt through the aperture 60 and through the cylindrical segment 58 and securing the bolt by a nut.

Figure 6:
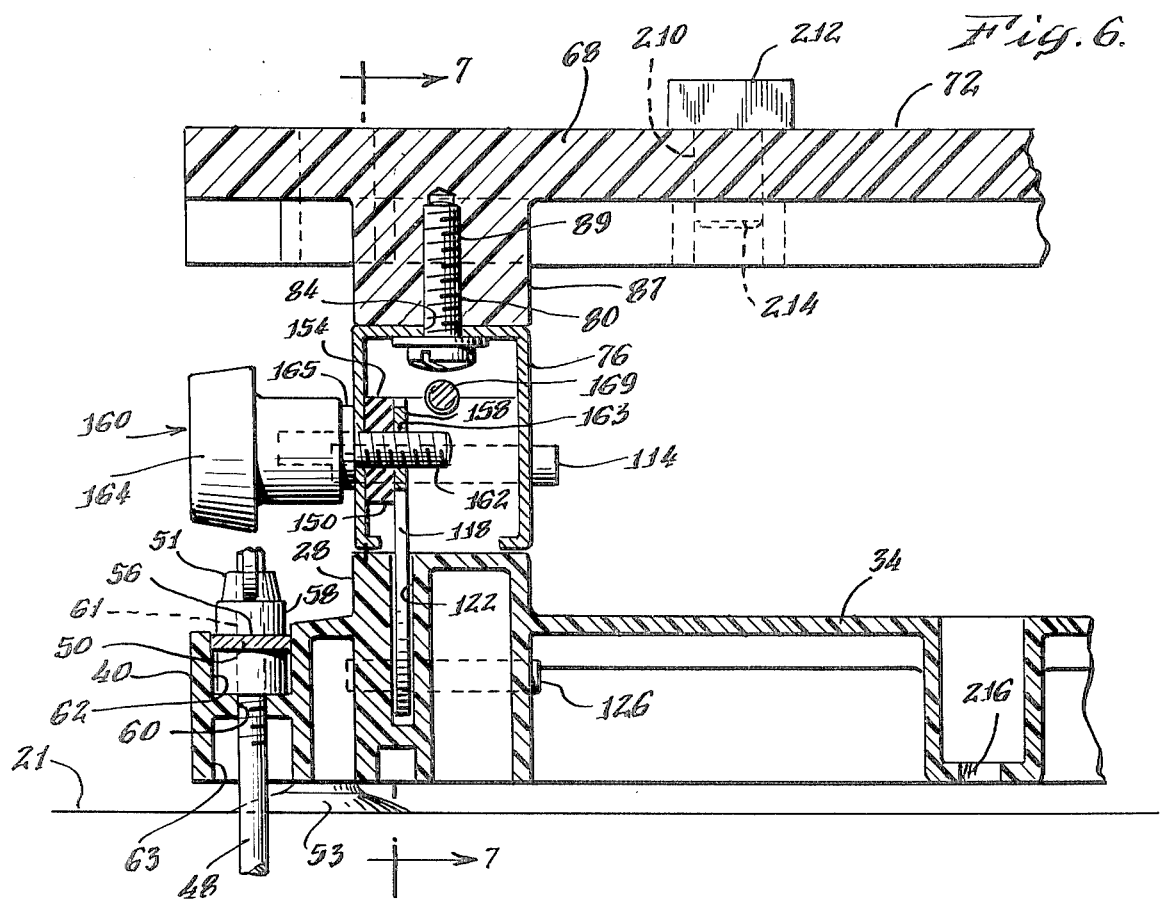
FIG. 6 is a view taken along lines 6—6 of FIG. 5.
Figure 7:
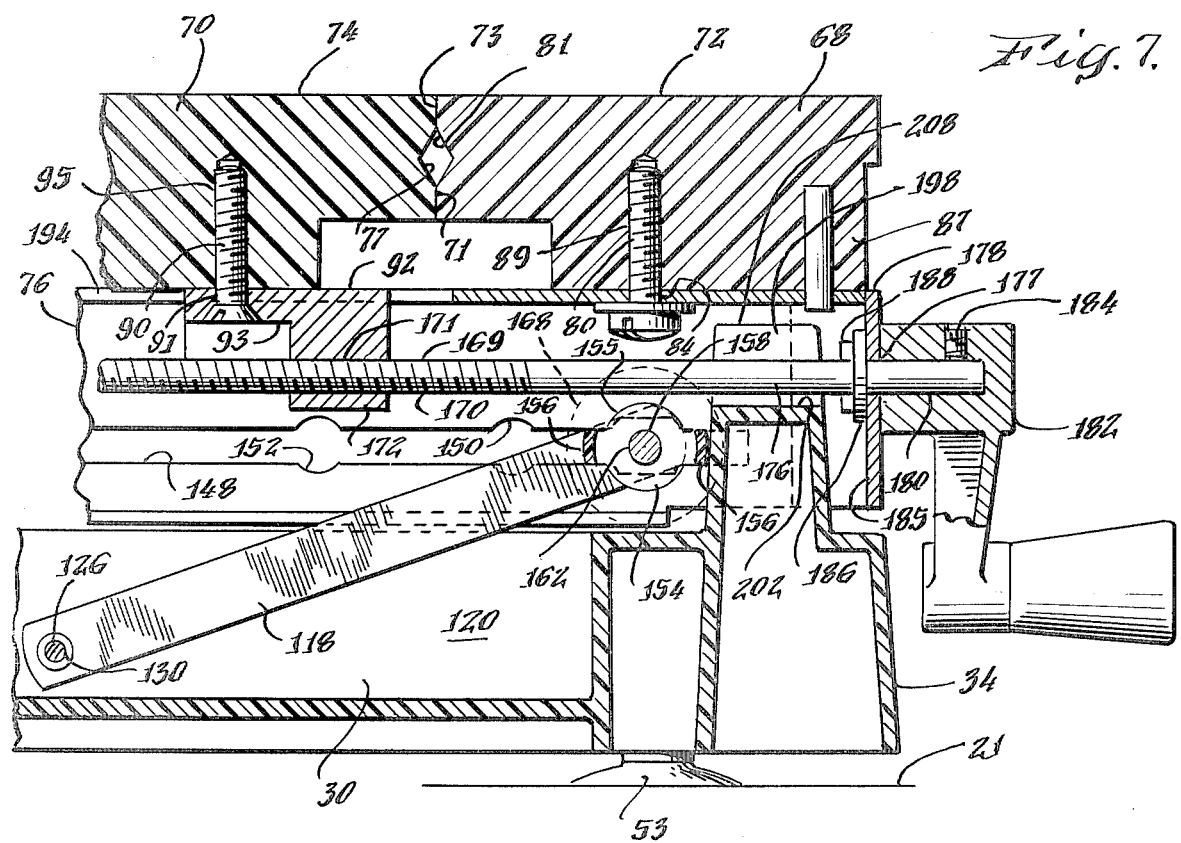
FIG. 7 is a view taken along line 7—7 of FIG. 6.

The mounting means 24 described thus far provides a convenient arrangement for rapidly mounting the worktable 20 to an auxiliary support structure 22 and for rapidly demounting the worktable. At times, the operations to be performed on a work piece can render unnecessary a relatively rigid mounting such as is provided by the clamping means described hereinafter. For example, in some hobby and artistic endeavors, such as scrolling, leather tooling, heat forming, etc. work piece mounting can be less rigid than required for cutting, drilling or hammering. A relatively rapid mounting is provided by suction surface means such as a plurality of suction cups which are secured by a screw means to a lower surface of the base support means 26. A plurality of suction cups are illustrated by the cups 53 and 55, as shown in FIGS. 5, 6 and 7. In a preferred embodiment, four suction cups are located and secured to the base support members adjacent or near the bosses formed therein. The mounting means 24 thus alternatively provides for a relatively rigid clamp means, a more rapid and relatively lighter mounting provided by suction surface means, and a semi-permanent installation provided by mounting screws without any need for altering the worktable 20.

First and second elongated worktable and adjustable work piece gripping members 68 and 70 provide a worktable for supporting a work piece and provide a means for gripping the work piece. The members 68 and 70 are generally rectangular in shape and have upper planer surfaces 72 and 74. Each of the members has a length which, in its usual orientation, extends generally parallel to the base members 32 and 34 and is substantially greater than a width thereof. As indicated hereinafter, adjustable angularity means enables variation of this orientation for the member 70. The members 68 and 70 are supported on the base means 26 in a work plane. The work plane is represented in FIG. 5 by the line 75 in a first orientation and by the line 75' at a different orientation. In the orientation represented by the line 75, the table members are positioned parallel to and juxtaposed with the base support means 26. Table members 68 and 70 have surface areas which, in view of the portability of the worktable 20, provides a substantially large work surface area upon which a workpiece can be positioned and supported during a working operation. In an exemplary arrangement which is not considered limiting of the invention in any respect, the length of each of the members 68 and 70 is about sixteen inches and the widths of these members is about four inches to provide an overall work surface area of about 128 in.$^2$ As described in more detail hereinafter with respect to the angularity control, a means is provided for varying the relative position of the members 68 and 70 in the workplane 75, thereby enabling vertical edge surfaces 71 and 73 to grip and firmly support a workpiece therebetween. In a preferred embodiment, the table member 68 is maintained stationary in the workplane 75 while the table member 70 transverses the workplane to establish a spacing between the gripping edges 71 and 73 for gripping workpieces of different sizes. Edge 71 includes a formed segment 77 for gripping a tubular body therebetween in a first direction and a formed segment 79 for gripping a tubular body in a second normal direction. The edge 73 includes similar gripping segments 81 and 83 (FIGS. 4 and 5).

A means for supporting and positioning the worktable members 68 and 70 in a workplane 75 which, in one orientation, is substantially parallel to and juxtaposed the support base means 26 comprises first and second elongated, rectilinear extending, channel shaped, parallel aligned table support members 76 and 78. The worktable member 68 is positioned at a relatively forward location on the members 76 and 78 and is secured thereto by screws 80 and 82 which extend through apertures 84 and 86 in the channel members 76 and 78 respectively and extend into and engage lower block segments 87 and 88 of the member. FIGS. 6 and 7 illustrate the screw 80 engaging a bore 89 in the block 87. Table member 68 is mounted in a stationary position on these channel members. Table member 70 is mounted to the channel 76 by a screw 90 which extends through an aperture 91 in a segment 93 of a travel block 92 (FIG. 7), and engages a bore 95 of the table member 70. The screw 90, while restraining the member 70, can rotate in the block 92. Similarly, a screw 94 (FIG. 4) extends through an aperture in a segment of a travel block 96 and while maintaining the table member 70 in contact with the channel 78 is free to rotate in the block 96. The members 68 and 70 are therefore constrained against an upper surface of the channel members 76 and 78 and the relative position of the table members in the work plane 75 is altered by varying the position of the member 70 with respect to the position of the stationery member 68.

The means for positioning the table members 68 and 70 in the work plane 75 further includes posts 102 and 104 (FIG. 3) which are integrally formed with base members 28 and 30 respectively. Distal segments 103 and 105 of the channel members 76 and 78 respectively, extend about these posts and apertures 106 and 108 in the posts align with apertures 110 and 112 in channel members 76 and 78 respectively. A pivot pin 114 extends through the apertures 110 and 106 in the channel 76 and post 102 respectively to provide a pivotal mounting of this channel at one of end of the base support member 28. Similarly, a pivot pin 116 extends through aligned apertures 112 and 108 in the channel 78 and post 104 respectively to provide pivotal mounting of this channel at one end of the base support member 30. By virtue of this pivotal mounting, the work plane 75 of the table members 68 and 70 can be varied with respect to a horizontal plane of the base support means 26 by gripping the channel members and rotating the supported gripping surfaces 68 and 70 about the pivotal mountings.

A means is provided for supporting and maintaining the work plane at an elevated angular position with respect to a plane through the base support means 26. This means comprises, in addition to the pivotal mounting means described hereinbefore, an intermediate support means and means for locking the intermediate support means at a selected position. The intermediate support means comprises first and second brackets 118 and 120 which are positioned in elongated slots 122 and 124 formed in the base support members 28 and 30 respectively. The bracket 118 is pivotally mounted to the base member 28 at an intermediate location along the length of member 28 by a pivot pin 126 which extends through an aperture 130 formed at one end of the bracket 118 and through aligned apertures 128 formed in the base member at the intermediate location. Similarly, the bracket 120 is pivotally mounted at an intermediate location along the length of the base member 30 by a pivot pin 131 which extends through apertures 134 formed in this base member and through an aperture 136 which is formed at one end of the bracket 120 and which is aligned with the apertures 134. Each of the channels 76 and 78 includes a longitudinally extending guide slot. A guide slot 138 is formed in the channel 78 and includes a plurality of indexing means. Indexing means comprising a plurality of semicircular enlargements 140, 142, 144 and 146 are formed in the guide slot 138 for extablishing index positions for different elevations of the table. The channel 76 also includes a guide slot 148 having a similar number of indexing enlargements formed therein. The view of the channel 76 of FIG. 3 is partly cut away and partly in section so that only the indexing enlargements 150 and 152 are shown therein. A circular guide body 154 is provided which is positioned within the body of the channel member 76 at a transverse location intermediate the bracket 118 and the rectlinear guide slot 148. The guide body 154 includes a generally circular-shaped segment 155 and a pair of tabs 156 extending from the circular segment. The tabs 156 are dimensioned for extension through and engagement with the guide slot 148. An aperture 158 is formed in the circular segment.

A lock means comprising a manually adjustable lock screw 160 having an elongated threaded segment 162 (FIG. 4) is provided which extends through the guide slot 148, through the aperture 158 in the guide body 154, and engages a threaded aperture 163 formed in a distal segment of the bracket 118. The manually adjustable screw 160 includes a generally cylindrically-shaped knob segment 164 and a shoulder segment 165 of relatively reduced diameter. The shoulder segment 165 is demensioned to engage and extend through an enlarged circular, segment indexing aperture formed in the elongated slot 148. A similar guide body 166 (FIG. 8) and manually adjustable lock knob 168 is provided for use with the channel 78.

The workplane of the worktable is rotatable between an orientation parallel to the plane of the base member 26 and antiparallel orientations and over a limited range of between 0° to about 90° from the parallel orientation. The worktable is supported and maintained at a desired elevation by rotating the manually adjustable lock knobs 164 and 168 thereby freeing the tabs of the guide bodies for sliding engagement with the elongated guide slots 138 and 148. The indexing enlargements are positioned along the length of the channel members for establishing index elevations of the table at 0° corresponding to a parallel and juxtaposed orientation of the worktable with respect to the support base 26, at 15°, at 30° and at 45°. Other indexing positions can be provided as desired. When one of these selective index positions has been reached, the shoulder 165 of the guide knob 164 will be aligned with an indexing enlargement and will extend therethrough upon tightening engagement of the screw 162 with the threaded aperture 163 of the bracket 118. By tightening the screw 162, the guide body tabs and the guide body as well as the bracket 118 will be secured tightly in position at the indexed location. The same is true with respect to the knob 168 and it is understood that the guide bodies for each of the channels 76 and 78 slide synchronously through their respective guides to the desired indexed locations. Unscrewing the knobs reduces frictional engagement between the surfaces of the bracket 118, the guide body and the screw thereby freeing the guides for sliding engagement in the slot to an alternate indexed position.

A means for varying the relative spacing between the first and second table members 68 and 70 is provided, and includes a first elongated screw 169 (FIG. 7) having a threaded segment 170 which extends through and engages a threaded bore 171 of a segment 172 of the travel block 92. The screw 90 as indicated hereinbefore, is secured to the member 70 and the travel block 92 is supported therefrom. An unthreaded segment 176 of the screw 169 extends through an aperture 177 in a cap plate 178. This cap plate is mounted to the channel 76 by spot welding, for example. The distal segment of the screw 169 is positioned in a bore 180 of a hand operated crank 182. The crank is secured to the distal screw segment by a roll pin 184. The screw 169 also extends through an aperture in a metal disc 186 which is positioned adjacent an inner surface 185 of the cap plate 178. A pin 188 extends through a bore formed in the screw segment 176 adjacent the location of the cap plate 178.

As the crank 182 is rotated, the screw 169 is subjected to a rotational movement. Longitudinal movement of the screw 169 is restricted by the pin and washer assembly 186, 188 and by the crank 182. Since longitudinal motion of the screw 169 is restrained, its rotational movement is translated into linear movement of block 92 which travels along the screw. Motion is imparted to one end of the table member 70 by the traveling screw 90 which extends through an elongated slot 194 in the channel 76 and, as indicated, engages the bore 95 in table member 70. A similar elongated screw 190 (FIG. 4), crank 192 and restraining pin and washer assembly, not illustrated, converts rotational motion of the crank to linear motion of the travel block 96 thereby imparting motion to screw 94 which extends through an elongated slot 196 in an upper surface of the channel 78. Motion is thus imparted to the other end of the travel member 70 by rotation of the crank 192. Since the screws 90 and 94 are free to rotate in their associated travel blocks, table member 70 rotates accordingly with the screws.

A means is provided for stabilizing the table members 68 and 70 in a plane parallel to and juxtaposed with the base 26. The stabilizing means includes nesting posts 198 and 200 which are integrally formed with the base members 28 and 30 respectively. Channel support members 76 and 78 and posts 198 and 200 are relatively dimensioned for providing a clearance which enables telescoping extension of the posts between wall segments of the channel members. A generally U-shaped cavity 202 is formed in the post 198 for receiving and nesting of the screw 169 when the worktable members are substantially parallel to and juxtaposed with the base 26. The post 200 includes a similar cavity 204 for receiving and nesting the screw 190. Channel members 76 and 78 are thus spaced apart from the base body by the posts 198 and 200 while the screws 169 and 190 are rotatable in the U-shaped cavity upon rotation of the cranks 182 and 192 respectively.

A plurality of apertures 210 are formed in the table members 68 and 70 for receiving hold down pegs 212. These pegs include cylindrical segments 214 which extend into and engage the apertures 210. The pegs 212 are rotatable in the apertures 210. By spacing apart the table members 68 and 70, a relatively wide work piece such as is illustrated by work piece 25 in FIG. 2, can be positioned between pegs 212 on the opposite table members and is firmly gripped.

A feature of worktable 20 is its portability and compactness for storage. The worktable 20 can be stored by positioning on a level surface. Alternatively, it can be stored by supporting from a vertical surface such as a wall. An aperture 216 (FIG. 6) is formed in the base member 34 for storing the worktable 20 on a support peg in a vertical wall structure.

An improved worktable for mounting to a surface of an auxiliary support structure has thus been described which provides for selectably varying an orientation of a workplane. The adjustable workplane advantageously enables the positioning of a workpiece at different attitudes and facilitates operations on the workpiece. The different workplane orientations are indexed to predetermined orientations and the worktable is maintained at the indexed orientations by manually operable locking means. The worktable is further advantageous in that the described adjustable orientation is accomplished by a relatively non complex mechanical means which is economically fabricated.

While there has been described a particular embodiment of the invention, it will be appreciated by those skilled in the art that variations may be made thereto without departing from the spirit of the invention and the scope of the appendant claims.

What is claimed is:

1. A portable worktable comprising:
   (a) a generally frame shaped worktable support base;
   (b) first and second elongated table members each having a planar work support surface for supporting and gripping a workpiece therebetween.
   (c) first and second elongated, rectilinear extending table support members for supporting said table members on said base;
   (d) means for varying the relative position between said table members in a work plane;
   (e) means for pivotally mounting said table support members at end segments thereof to said support base for selectably positioning said work table in a plane substantially parallel to said base and in planes angularly orientated with respect to said base; and,
   (f) means for maintaining said wortable at a selected orientation.

2. A portable worktable comprising:
   (a) a generally annular rectangular shaped worktable support base extending in a first plane and adapted to be supported on an auxiliary support surface extending in a direction parallel to said first plane;
   (b) first and second elongated table members each having a planar work support surface for supporting and gripping a workpiece therebetween;
   (c) means for varying the relative position between said table members in a work plane;
   (d) means including first and second elongated table support members having a length thereof for pivotally mounting said worktable members to said base for selectably positioning said wortable in a plane substantially parallel to said base and in planes angularly orientated with respect to said base over a range of angles limited to between 0° and about 90°; and,
   (e) means including a manually adjustable restraint positioned at an intermediate location along the length of a table support member for maintaining said wortable at a selected orientation.

3. A worktable for use with an auxiliary support structure comprising:
   (a) a generally frame shaped support base means formed of a polymer plastic extending in a first plane and adapted to be supported on an auxiliary support surface extending in a direction parallel to said first plane;
   (b) first and second elongated table members each having a planar workpiece support surface for supporting and gripping a workpiece therebetween;
   (c) means for varying the relative position between said first and second table members in a work plane to provide a space therebetween for receiving and gripping workpieces of different sizes between said members;
   (d) means including first and second elongated support members for pivotally mounting said first and second table members to said support base in a work plane having a first orientation which is substantially parallel to, and juxtaposed with, said support base and for selectably varying the orientation of said work plane from said first parallel orientation to a plurality of different nonparallel orientations over a limited angular range of between 0° and about 90°;
   (e) means including a manually adjustable restraint which is mounted for transport with said support member for maintaining said work surface at a selected work plane orientation; and,
   (f) means for mounting said support base to said auxiliary support structure.

4. The worktable of claim 3 wherein said means for maintaining said work surface at a selected work plane orientation includes index means positioned on said elongated support member for meaintaining said work plane at a predetermined index orientation.

5. The worktable of claim 4 including means for establishing an index orientation for said work plane and restraint means locks said worktable at said indexed orientation.

6. The worktable of claim 3 wherein said elongated table support members are pivotally mounted at distal segments thereof to said support base means.

7. A worktable for mounting to a surface of an auxiliary support structure comprising:
   (a) a frame shaped base body formed of a polymer plastic and having first and second parallel aligned, elongated integral members and third and fourth parallel aligned elongated integral members;
   (b) first and second elongated, table members each having a planar workpiece support surface for supporting and gripping a workpiece therebetween;
   (c) means for varying the relative position between said first and second table members in a work plane to provide a spacing therebetween for receiving and gripping workpieces of different sizes between said members;

(d) first and second parallel aligned channel shaped elongated table support members;

(e) means including post means integrally formed with said base body for pivotally mounting said table support members at end segments thereof to said base body;

(f) an elongated bracket body;

(g) means for pivotally mounting said bracket body at a first end segment thereof to said first base member;

(h) means for coupling a second end of said bracket body in sliding engagement with an elongated segment of a table support member;

(i) means for engaging said bracket body and said first table support member for restraining sliding motion thereof at a selected orientation of said table members; and, (j) means for mounting said base body to an auxiliary support structure.

8. The worktable of claim 7 including a second bracket body pivotally mounted at a first end segment thereof to said second base member, means for coupling a second end of said second bracket body in sliding engagement with an elongated segment of said second table support member, and means for engaging said second bracket body and said second table support member for restraining sliding motion thereof at a selected orientation of said table members.

9. The worktable of claim 7 wherein said first base member includes an elongated slot extending along the length of said first base member and said bracket body extends through said slot to said pivotal mounting means whereby sliding engagement of said bracket with said table support member causes said bracket body to alternatively extend from and to be recessed in said slot upon rotary motion of said table member in alternative directions.

10. The worktable of claim 8 wherein said means for coupling said second end of said first bracket body in sliding engagement with an elongated segment of said first table support member comprises an elongated slot formed in said first table support member and means for maintaining a segment of said second end of said bracket body in alignment with said slot upon rotation of said table support member.

11. The worktable of claim 10 wherein said means for maintaining alignment comprises a guide body having a segment thereof positioned in said slot for reciprocating sliding engagement therewith, and means for maintaining said second end of said bracket body in rotary sliding engagement with said guide body.

12. The worktable of claim 10 wherein said means for maintaining said bracket body in rotary sliding engagement with said guide body comprises an aperature formed in said guide body, an aperture formed in said segment of said second end of said bracket body, a restraining body extending through said slot, through said guide aperture and through said aperture of said bracket body, and means for maintaining said body in position in said slots and said aperture.

13. The worktable of claim 11 wherein said restraining body comprises a screw and said means for maintaining engagement comprises means mounted to said screw for limiting extension through said slot, and, said guide body aperture is threaded for engaging said screw.

14. The worktable of claim 13 including a plurality of enlarged index apertures formed along said slot for establishing predetermined orientation of said worktable.

15. The worktable of claim 14 including a manually rotatable knob mounted to said screw for rotation therewith, and a shoulder formed on said knob for engaging said enlarged index aperture in said slot.

16. A portable worktable which is adapted to be mounted on a surface of an auxiliary support structure comprising a frame shaped base body formed of a polymer plastic, a work surface supported on said base body and formed by a pair of elongated table members orientated in a plane with respect to said surface of said support structure, said table members mounted for movement in a plane on first and second table support members, means for varying the orientation of said table members with respect to said support structure surface upon application of a manual force, said means including a bracket extending between said base body and said table support member for supporting said table members in an anti-parallel orientation with respect to said support structure surface, and manually adjustable means for restraining movement of said bracket upon manually positioning said worktable members at a desired orientation.

17. The worktable of claim 16 wherein said table support member comprises an elongated body pivotally mounted at one end thereof for supporting said worktable members, said body including a longitudinally extending slot formed therein, and adjustable means for providing engagement between said slot and a distal segment of said bracket.

18. The worktable of claim 17 including means for engaging said slot and said distal segment of said bracket, said engaging means traversing a rectilinear course in said slot upon rotary motion of said bracket.

19. A worktable for use with an auxiliary support structure comprising:

(a) a generally frame shaped support base means formed of a polymer plastic extending in a first plane and adapted to be supported on an auxiliary support surface extending in a direction parallel to said first plane;

(b) said support base means having first and second parallel aligned frame members;

(c) first and second elongated table members each having a planar workpiece support surface for supporting and gripping a workpiece therebetween;

(d) means for varying the relative position between said first and second table members in a work plane for providing a space therebetween for receiving and gripping workpieces of different sizes between said members;

(e) means including first and second table elongated support members for mounting said first and second table members to said support base in a work plane having a first orientation which is substantially parallel to and juxtaposed with said support base and for selectively varying the orientation of said work plane from said first parallel orientation to a plurality of different non-parallel orientations over a limited angular range of between 0° and 90°;

(f) means including first and second support bracket bodies pivotally coupled to said first and second support base members respectively and coupled in sliding engagement with said first and second table support members respectively for maintaining said work surface at a selected work plane orientation;

(g) Manually adjustable lock means transportable with said table support members for restraining sliding engagement of said bracket bodies at a preselected work plane orientation; and, (h) means for mounting said support base to said auxiliary support structure.

20. The worktable of claim 19 wherein said manually adjustable lock means is mounted for engagement and sliding movement with said table support members for restraining said sliding bracket bodies at a selected location along the length of said table support members.

* * * * *